(12) United States Patent
Sinha et al.

(10) Patent No.: US 10,587,526 B2
(45) Date of Patent: Mar. 10, 2020

(54) FEDERATED SCHEME FOR COORDINATING THROTTLED NETWORK DATA TRANSFER IN A MULTI-HOST SCENARIO

(71) Applicant: Walmart Apollo, LLC, Bentonville, AR (US)

(72) Inventors: Ravi Shanker Kumar Sinha, Bangalore (IN); Puneet Jolly, Bengaluru (IN); Parijat Bansal, Bangalore (IN); Soumyajit Das, Bengaluru (IN); K Vamsi Krishna, Bangalore (IN)

(73) Assignee: Walmart Apollo, LLC, Bentonville, AR (US)

( * ) Notice: Subject to any disclaimer, the term of this patent is extended or adjusted under 35 U.S.C. 154(b) by 24 days.

(21) Appl. No.: 15/254,082

(22) Filed: Sep. 1, 2016

(65) Prior Publication Data
US 2017/0346754 A1    Nov. 30, 2017

(30) Foreign Application Priority Data
May 30, 2016 (IN) .............................. 201641018485

(51) Int. Cl.
*H04L 12/873* (2013.01)
*H04L 29/08* (2006.01)

(52) U.S. Cl.
CPC ........ *H04L 47/527* (2013.01); *H04L 67/1095* (2013.01); *H04L 67/16* (2013.01)

(58) Field of Classification Search
CPC ........ G06N 99/005; G06N 3/02; H04L 67/22; H04L 67/306; H04L 43/16; H04L 47/215;

(Continued)

(56) References Cited

U.S. PATENT DOCUMENTS 4,726,018 A * 2/1988 Bux ...................... H04L 12/433
                                                    370/455
4,949,337 A * 8/1990 Aggers ................ H04L 12/417
                                                    370/451

(Continued)

FOREIGN PATENT DOCUMENTS

EP        2618541 A1    7/2013

OTHER PUBLICATIONS

Shieh A, Kandula S, Greenberg AG, Kim C, Saha B. Sharing the Data Center Network. InNSDI Mar. 30, 2011 (vol. 11, pp. 23-23). (Year: 2011).*

(Continued)

*Primary Examiner* — James N Fiorillo
(74) *Attorney, Agent, or Firm* — Patterson Thuente Pedersen, P.A.

(57) ABSTRACT

Embodiments relate to systems and methods that facilitate coordination amongst host devices that share network resources in order to use available bandwidth effectively. Embodiments can ensure the host devices themselves take responsibility for sending their data via shared network bandwidth, keeping access to bandwidth fair to all the host devices. Embodiments also include adapting to a continuously changing network bandwidth allocation policy for the shared network resource. In one embodiment, this includes using tokens (e.g., small chunk messages) to represent a grant to a host device to send a specified number of bytes over the network. Using a token generator module and a distributed queue, embodiments provide a unique and adaptive way to manage data transmissions among host devices within available resources.

18 Claims, 20 Drawing Sheets

(58) Field of Classification Search
CPC ... H04L 47/527; H04L 47/562; H04L 12/417;
H04L 12/433; H04L 12/1868; H04L
12/4625; H04L 67/16; H04L 67/1002;
H04L 67/1095
USPC ........ 709/203, 206, 217, 223, 204; 370/412,
370/276
See application file for complete search history.

(56) References Cited

U.S. PATENT DOCUMENTS

| | | | | |
|---|---|---|---|---|
| 5,043,981 | A * | 8/1991 | Firoozmand | H04L 12/433 370/235 |
| 5,596,576 | A | 1/1997 | Milito | |
| 6,957,776 | B1 * | 10/2005 | Ng | G06Q 20/341 235/375 |
| 6,965,933 | B2 | 11/2005 | Haartsen | |
| 7,110,411 | B2 * | 9/2006 | Saidi | H04L 47/522 370/395.4 |
| 7,409,460 | B1 * | 8/2008 | Li | H04L 29/06 709/238 |
| 7,631,131 | B2 | 12/2009 | Chen | |
| 7,872,968 | B2 | 1/2011 | Gorti | |
| 8,051,172 | B2 | 11/2011 | Sampson | |
| 8,060,679 | B2 | 11/2011 | Nozaki et al. | |
| 8,553,538 | B2 * | 10/2013 | Nishimura | H04L 47/10 370/229 |
| 8,887,260 | B2 | 11/2014 | Marcotte | |
| 9,405,597 | B1 * | 8/2016 | Luff | G06F 9/54 |
| 2001/0033581 | A1 * | 10/2001 | Kawarai | H04L 47/10 370/468 |
| 2002/0129096 | A1 * | 9/2002 | Mansour | G06F 9/451 709/203 |
| 2003/0172189 | A1 * | 9/2003 | Greenblat | G06F 15/78 709/251 |
| 2004/0218604 | A1 | 11/2004 | Porter | |
| 2004/0264486 | A1 * | 12/2004 | Sankey | H04L 47/527 370/412 |
| 2005/0058149 | A1 * | 3/2005 | Howe | H04L 47/10 370/428 |
| 2005/0120102 | A1 | 6/2005 | Gandhi | |
| 2006/0015566 | A1 * | 1/2006 | Sampson | H04L 51/12 709/206 |
| 2007/0014289 | A1 * | 1/2007 | Settle | H04L 12/1881 370/390 |
| 2007/0133407 | A1 | 6/2007 | Choi | |
| 2007/0174883 | A1 | 7/2007 | McEnroe | |
| 2007/0180112 | A1 | 8/2007 | McEnroe | |
| 2007/0294447 | A1 * | 12/2007 | Nozaki | G06F 13/1642 710/240 |
| 2009/0296729 | A1 * | 12/2009 | Urano | H04L 47/10 370/412 |
| 2010/0100952 | A1 * | 4/2010 | Sample | H04L 51/066 726/9 |
| 2010/0208614 | A1 * | 8/2010 | Harmatos | H04L 47/215 370/253 |
| 2010/0278190 | A1 * | 11/2010 | Yip | H04L 47/60 370/412 |
| 2011/0320915 | A1 * | 12/2011 | Khan | G06F 3/0608 714/773 |
| 2012/0195324 | A1 | 8/2012 | Raghuraman | |
| 2013/0044745 | A1 * | 2/2013 | Imamura | H04L 47/215 370/351 |
| 2013/0179553 | A1 * | 7/2013 | Elko | G06F 11/2007 709/223 |
| 2014/0123312 | A1 * | 5/2014 | Marcotte | G06F 21/33 726/28 |
| 2014/0355442 | A1 * | 12/2014 | Isobe | H04L 69/16 370/235 |
| 2014/0372516 | A1 * | 12/2014 | Watte | H04L 51/14 709/203 |
| 2014/0379910 | A1 | 12/2014 | Saxena | |
| 2015/0113549 | A1 | 4/2015 | Wolf | |
| 2015/0249588 | A1 * | 9/2015 | Leon | G06F 9/4416 709/204 |
| 2015/0304110 | A1 * | 10/2015 | Oberheide | H04L 63/12 713/155 |
| 2016/0182693 | A1 * | 6/2016 | Ferguson | H04L 12/1868 709/217 |
| 2016/0323378 | A1 * | 11/2016 | Coskun | G06F 9/4451 |
| 2017/0126908 | A1 * | 5/2017 | Ahmadyar | H04N 1/00344 |

OTHER PUBLICATIONS

International Search Report and Written Opinion, Application No. PCT/US2017/034633, dated Aug. 14, 2017, 12 pages.
International Preliminary Report on Patentability, Application No. PCT/US2017/034633, dated Dec. 13, 2018, 11 pages.

* cited by examiner

FEDERATED SCHEME FOR COORDINATING THROTTLED NETWORK DATA TRANSFER IN A MULTI-HOST SCENARIO

RELATED APPLICATION

The present application claims priority to India Application No. 201641018485 filed May 30, 2016, which is hereby incorporated herein in its entirety by reference.

TECHNICAL FIELD

The disclosure relates generally to computer networks and more specifically to systems and methods for coordinating utilization of available network resources among devices.

BACKGROUND

A cluster of computer devices may share a common link to an outside network. This cluster of computer devices is allocated some fraction of total network bandwidth, which changes dynamically. Managing use of the bandwidth amongst the computer devices in the cluster can be challenging, particularly when the bandwidth allocation is limited and data integrity is important.

A conventional approach includes making one computer device a master device so that it takes responsibility for transferring all data to a centralized server with a given bandwidth policy, with the other computer devices transferring their data to the master device first. A significant drawback of this approach is that it creates a high volume of data movement on the internal network between the computer devices and the master device. Additionally, routing all the traffic via the master device creates a single point of failure, which increases risk in the system.

Another conventional approach includes throttling data packets at the router level. This approach involves dropping data packets if the transmission rate is above the specified norm specified in the policies. This requires the involvement of routers, whose configuration then has to be constantly kept in sync with the configuration (i.e., port number, etc.) of applications running on the hosts. Also, since one log message may be split across multiple network packets while sending, dropping even one of those packets will lead to data inconsistency in the message arriving at the other end.

SUMMARY

In an embodiment, a multi-host system for coordinating data transfer on a network comprises a plurality of host devices communicatively coupled to the network, each of the plurality of host devices comprising: a portion of a distributed queue, each portion of the distributed queue of one of the plurality of host devices being synched with other portions of the distributed queue of other ones of the plurality of host devices, and a token generator module, the token generator module of one of the plurality of host devices being an active token generator module configured to generate and send at least one new token to the distributed queue such that any of the plurality of host devices that query the distributed queue receive a new token from the distributed queue, the received new token permitting a recipient host device to send data via the network in accordance with a term of the received new token.

In an embodiment, a method of coordinating data transfer on a network comprises generating at least one new token by an active token generator module of one of a plurality of devices communicatively coupled to the network; holding the generated at least one new token in a queue distributed and synchronized between the plurality of devices; requesting a new token from the queue by any of the plurality of devices that wants to send data over the network; receiving the new token by the requesting device; checking at least one term of the received new token; and sending the data over the network by the requesting device in accordance with the at least one term.

Figure 1A:
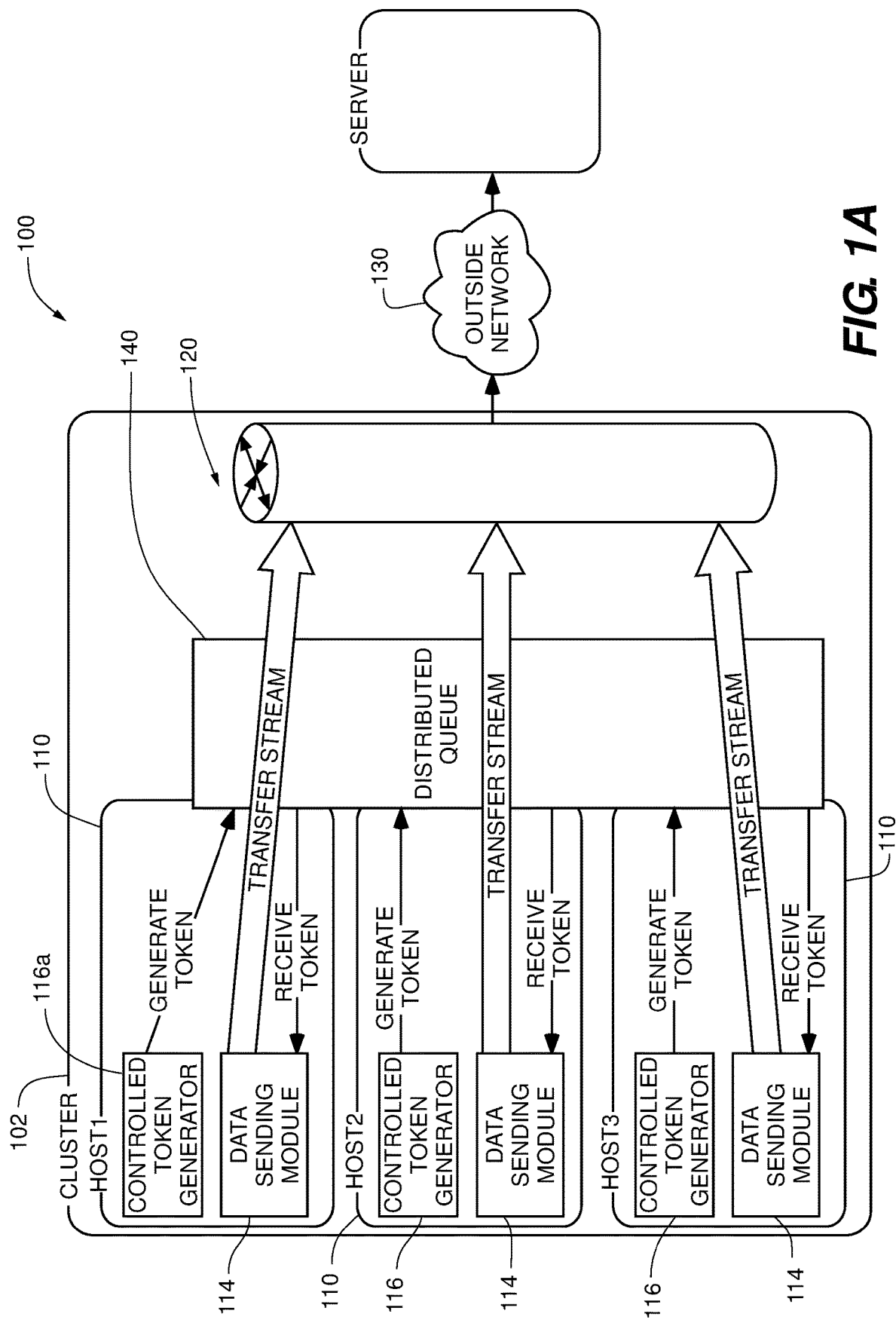
FIG. 1A is a block diagram of a multi-host system for coordinating data transfer on a network according to an embodiment.

While embodiments are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Embodiments relate to systems and methods that facilitate coordination amongst host devices that share network resources in order to use available bandwidth effectively. Embodiments can ensure the host devices themselves take responsibility for sending their data via shared network bandwidth, keeping access to bandwidth fair to all the host devices. Embodiments also include adapting to a continuously changing network bandwidth allocation policy for the shared network resource. In one embodiment, this includes using tokens (e.g., small chunk messages) to represent a grant to a host device to send a specified number of bytes over the network. Using a token generator module and a distributed queue, embodiments provide a unique and adaptive way to manage data transmissions among host devices within available resources.

More particularly, embodiments include systems and methods that provide a federated scheme in which host devices communicatively coupled to a network, or arranged in a cluster of host devices coupled to a network, can coordinate amongst themselves for making effective and efficient utilization of a shared network resource (e.g., bandwidth). In embodiments, the systems, methods and/or schemes can dynamically adapt to on-the-fly changes in network policies and bandwidth allocated to the cluster. Embodiments also enable prioritization of data types for transfer on the network without exceeding the bandwidth limit.

In one embodiment, each host device is responsible for sending its own data. Each host device comprises a token generator module, and one of the token generator modules is active at any given time. Having a token generator module on each host avoids a single point of failure in the system, as if one host or its token generator module goes down or becomes unavailable, the token generator module of another host can become the active host and take over token generating responsibility in the system. Tokens generated by the active token generator module can be populated in a distributed queue, which can comprise a distributed cache or memory synched between the hosts. This distributed queue configuration avoids the problem of any single host device being given unfair (e.g., faster) access to the queue. Embodiments also avoid placing a load on the internal network, as only tokens travel over the internal network rather than the data to be transferred itself.

Embodiments can include ensuring that the data transmission speed of the host devices dynamically adapts to on-the-fly changes in the bandwidth allocated and the adding or removing of host devices from the system. In embodiments, managing these events while keeping in accordance with a current bandwidth limitation can include changing a minimum or a maximum number of consumable tokens generated and/or changing an amount of data tokens permit to be sent. Embodiments also allow for prioritizing types of data over others. Certain data types may come from one host or another depending on the particular application(s) running on any host, such that producing special tokens for certain data types provide for those special tokens to be consumed only by the host(s) with those data types to send.

Figure 1B:
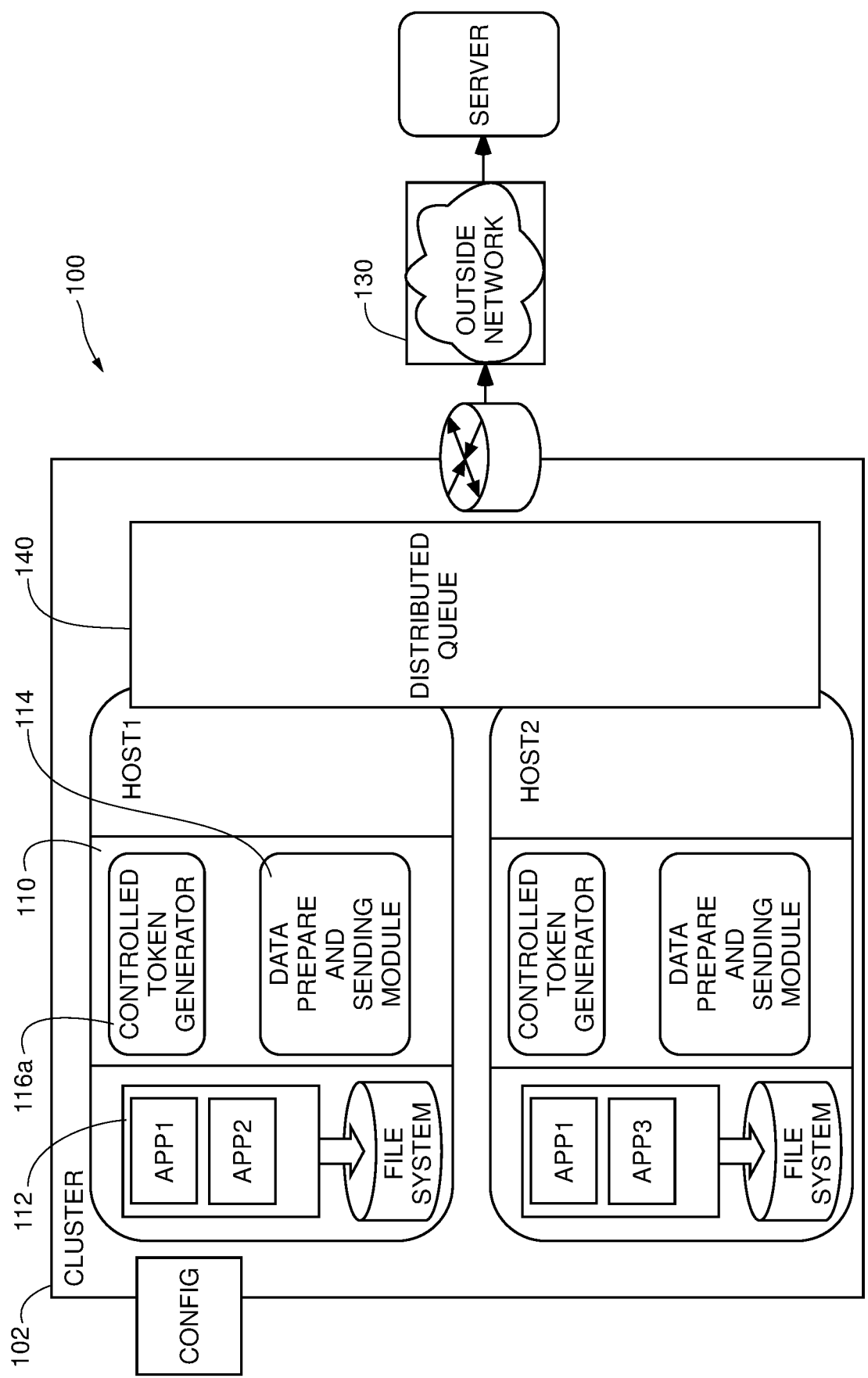
FIG. 1B is another block diagram of the multi-host system for coordinating data transfer on a network according to an embodiment.

Referring to FIGS. 1A and 1B, an embodiment of a multi-host system 100 for coordinating data transfer on a network is depicted. System 100 includes a plurality of host devices 110 (i.e., Host1, Host2, Host3) arranged in a cluster 102. Three host devices 110 are depicted in FIGS. 1A and 1B, though other embodiments can comprise more or fewer host devices 110, or more or fewer clusters 102. Each host device 110 is communicatively coupled to an internal network 120.

Each host device 110 can comprise a computer device, processor, engine, module, machine or the like, and host devices 110 within a cluster 102 can share information or data therebetween. Host devices 110 in cluster 102 can be the same as or different from each other, and host devices 110 can use the same or different types of files and data. In general, embodiments discussed herein can be applicable to a variety of different devices 110 types and configurations, wherein a plurality of devices 110 shares at least part of a communications connection over which data and information is transferred within a network or between networks. In other words, the various host devices 110 can be different devices with different data and usage demands, and embodiments discussed herein enable coordination among and management thereof.

Host devices 110 can host or comprise applications 112 (or "apps") operating on or utilizing resources to operate. In the same way that host devices 110 may share information or data, the operation of some apps 112 can be scaled across two or more host devices 110. For example, in FIG. 1B Host1 hosts two apps 112, App1 and App2, and Host2 hosts two apps 112, App1 and App3. App1 is scaled across both Host1 and Host2. This scaling can be done for a variety of reasons, including complexity, size or resources required by a particular app or available on a particular host device 110; load balancing among host devices 110 in a cluster 102 and/or system 100; and others.

Apps 112 are the sources of some or all of the data to be sent by host device 110 over network 120. Each host device 110 therefore can have multiple sources of data (e.g., multiple apps 112), multiple types of data, and multiple data streams to send. In embodiments, each host device 110 comprises a data management module 114 configured to prepare data received from apps 112 (or other sources in host device 110) and send the data via network 120. This can include implementing one or more data compression, multiplexing or other techniques by data management module 114 to facilitate data transfer in system 100.

With system 100 being a federated scheme, each host device 110 has responsibility for transferring its own data to an external or outside network 130, via shared internal network 120. In one embodiment, this is coordinated or facilitated by a token scheme in which each host device 110 includes a token generator module 116. Token generator module 116 can comprise part of an application operating on host device 110. In operation, one of the token generator modules 116 is active at any given time (denoted by the shading and 116a in the drawings) to generate and track tokens in system 100, but any other token generator module 116 may become active if a previously active token generator module 116a goes offline or otherwise becomes unavailable. This feature, like others in system 100, avoids creating a single failure point. Inactive token generator modules 116 can monitor the health of active token generator module 116a in order to detect any issues and appoint a new active token generator module if necessary. Which token generator module 116 is the active token generator module 116a can be determined based on a characteristic of the token generator module 116 and/or its corresponding host device 110. In one embodiment, the oldest host device 110 in cluster 102 is designated as the active token generator module 116a. In other embodiments, another scheme can be used to designate an active token generator module 116a as well as an order by which other token generator modules 116 can become active if necessary.

For example, in the embodiment of FIGS. 1A and 1B, Host1 is the oldest device, such that its token generator module 116 is the active token generator module 116a. If active token generator module 116a or its host device 110 (e.g., Host1) is or goes down (i.e., goes offline, becomes inoperative, or otherwise is not functioning), a token generator module 116 of another host device 110 (e.g., Host2) among the other host devices 110 in cluster 102 can take over the responsibility and its token generator module 116 can become the active token generator module 116a. Since there is no single host device 110 through which all the data passes in cluster 102 or system 100, only the responsibility of generating tokens is shifted to another host device 110, and operation of system 100 can proceed uninterrupted.

Tokens generated by token generator module 116a can be used by host devices 110 as grants or permission to send a specific number of bytes of data over network 120. Active token generator module 116a generates new tokens at a rate, with each token including an expiry time. The number of bytes of data associated with a given token is the value of the token, and the value of tokens can vary. In addition to the value and expiry time, each token can optionally include a data type if the token is a priority token for a particular data type to be sent.

In embodiments, the number of tokens, the value of a token, and the optional data type priority of a token can vary at any given instant. In one embodiment, these token characteristics can vary according to features or requirements of system 100, and in general policies related to the characteristics will be predefined. These policies also can be updated on the fly during operation, such as manually by a system administrator or user. For example, if a bandwidth allocation changes and an administrator updates a system 100 policy accordingly, the new policy can be implemented (e.g., by expiring any existing tokens and active token generator 116a generating new tokens according to the updated policy) without disruption to operation of system 100 or its components. In other embodiments, system 100 can set or update one or more of the characteristics automatically or semi-automatically, for example by a module or device of system 100 that is able to diagnose network conditions and calculate or determine at least one token characteristic therefrom, according to a set of rules or policies defined within system 100.

The number of tokens produced by active token generator module 116a per time unit (e.g., measured in seconds in one embodiment, but some other time unit larger or smaller can be used in other embodiments) can depend on the bandwidth allocated to cluster 102 of host devices 110 for data transmission and the number of host devices 110 in cluster 102. In other embodiments, some other criteria can be used to determine the number of tokens that is or can be produced.

The value of each token generated by active token generator module 116a can relate to the number of host devices 110 (e.g., the number of active host devices 110) in cluster 102 and/or system 100 in embodiments. The token value can be calculated in an embodiment according to a worst use case in which all host devices 110 have one token each and are to transmit their data simultaneously, and such that the bandwidth limit still would not be exceeded. This value can be calculated as:

$$\text{(max bandwidth allocation possible)}/(K*\text{number of host devices})$$

in which K is a configurable multiplier. For example, in an embodiment in which cluster 102 comprises two host devices 110, K may be 2 such that four tokens are generated, and the maximum bandwidth allocation is divided by 4 to determine the value of each of the four tokens.

An optional priority associated with a token is a specified data type in embodiments. For example, apps 150 have a variety of different types of data to send (e.g., application logs, audit logs, metric data, etc.), and some of the data may be more important than others, either generally, at a particular time, or in some particular circumstance. Thus, system 100 can prioritize that data by specifying the data type, just as by the application name, in a token. Any host device 110, via data management module 114, can request and receive such a token, but only a host device 110 with the specified type of data or application can consume that token. In other embodiments, types of prioritization other than data type and/or relative prioritization schemes also can be used (e.g., App1, then App2, etc.).

New tokens are sent by active token generator module 116a to distributed queue 140, which manages token usage amongst host devices 110 in system 100. Distributed queue 140 comprises a cache or memory distributed among and synched between host devices 110. This distributed but synched configuration of distributed queue 140 is yet another feature of the design of system 100 that avoids a single failure point. In operation, token generator 116a pushes generated tokens to distributed queue 140, and data management module 114 fetches tokens from distributed queue 140 in order to send data on network 120, thereby consuming the tokens. After each time unit, any unconsumed tokens are expired.

More particularly, each host device 110, via its data management module 114, can query distributed queue device 140 for a token if an app 150 of that host device 110 has data to send. Each host device 110 can be constrained in the sense that each host device 110 can only send data over network 120 when that host device 110 receives and consumes a token, and each host device 110 only requests a token when that host device has data to send. Furthermore, a host device 110 cannot consume more than one token at a time in an embodiment, though multiple host devices 110 may consume tokens individually at the same time. In other words, when a host device 110 has data to send, that host device 110 requests a token and sends the data upon receiving a token, thereby consuming the token. A host device 110 may only consume a prioritized token if it has that application or type of data to send; if not, the prioritized token is returned to distributed queue 140. In this way, system 100 can ensure that a single host 110 does not use all, or more than a fair share, of the available bandwidth, while also coordinating the sending of data on network 120 amongst host devices 110.

Several example scenarios will now be discussed. In these examples, like numbers will be used for like features (e.g., active token generator module as 116a and 216a; distributed queue as 140 and 240; etc.), though the features need not be identical in all embodiments. Additionally, each feature may not be discussed in detail in the context of each reference numeral; reference is made herein to the discussion associated with like-referenced features.

Figure 2A:
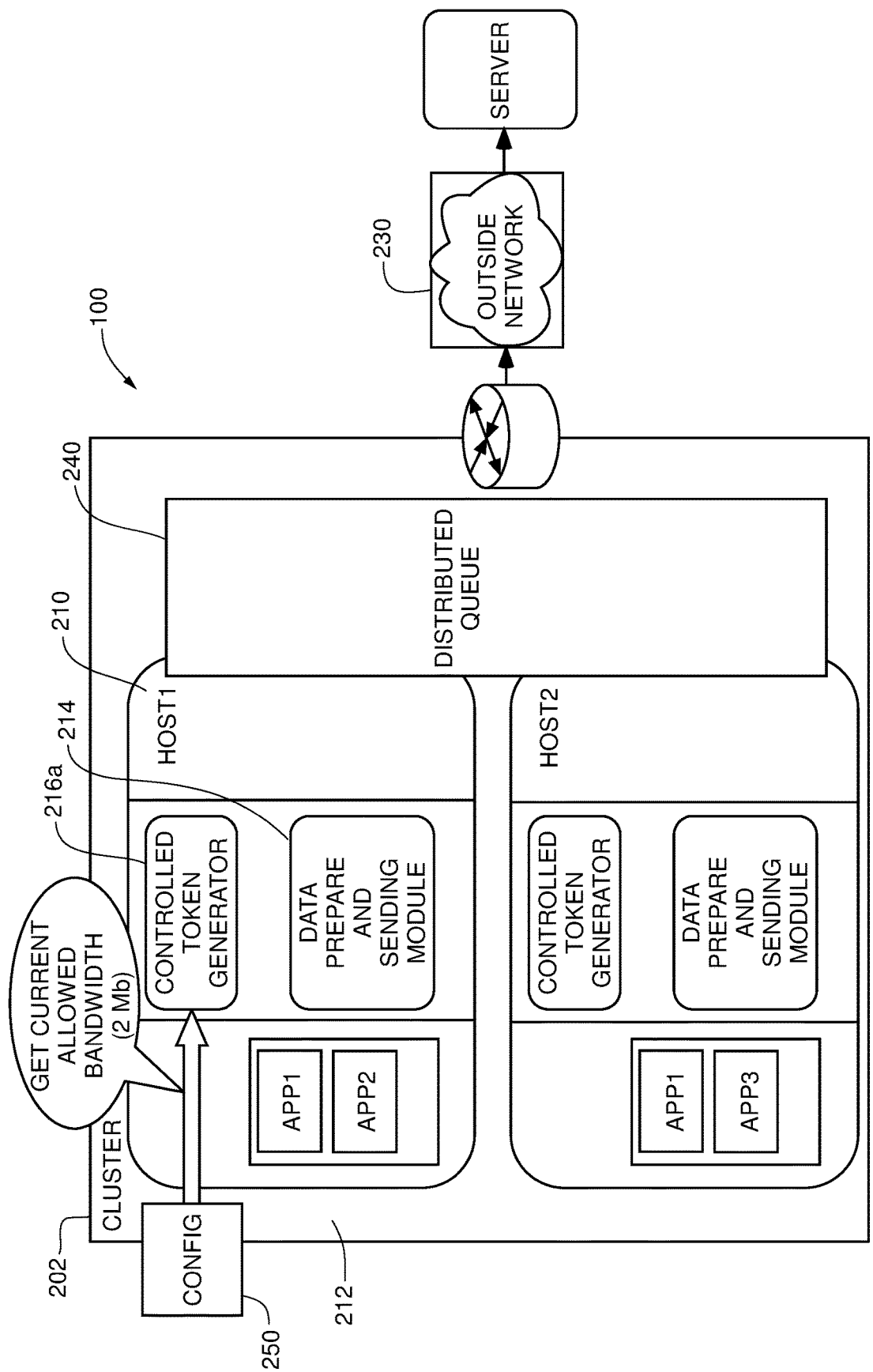
FIGS. 2A-2E are block diagrams that illustrate an example operation of a multi-host system for coordinating data transfer on a network according to an embodiment.
Figure 2B:
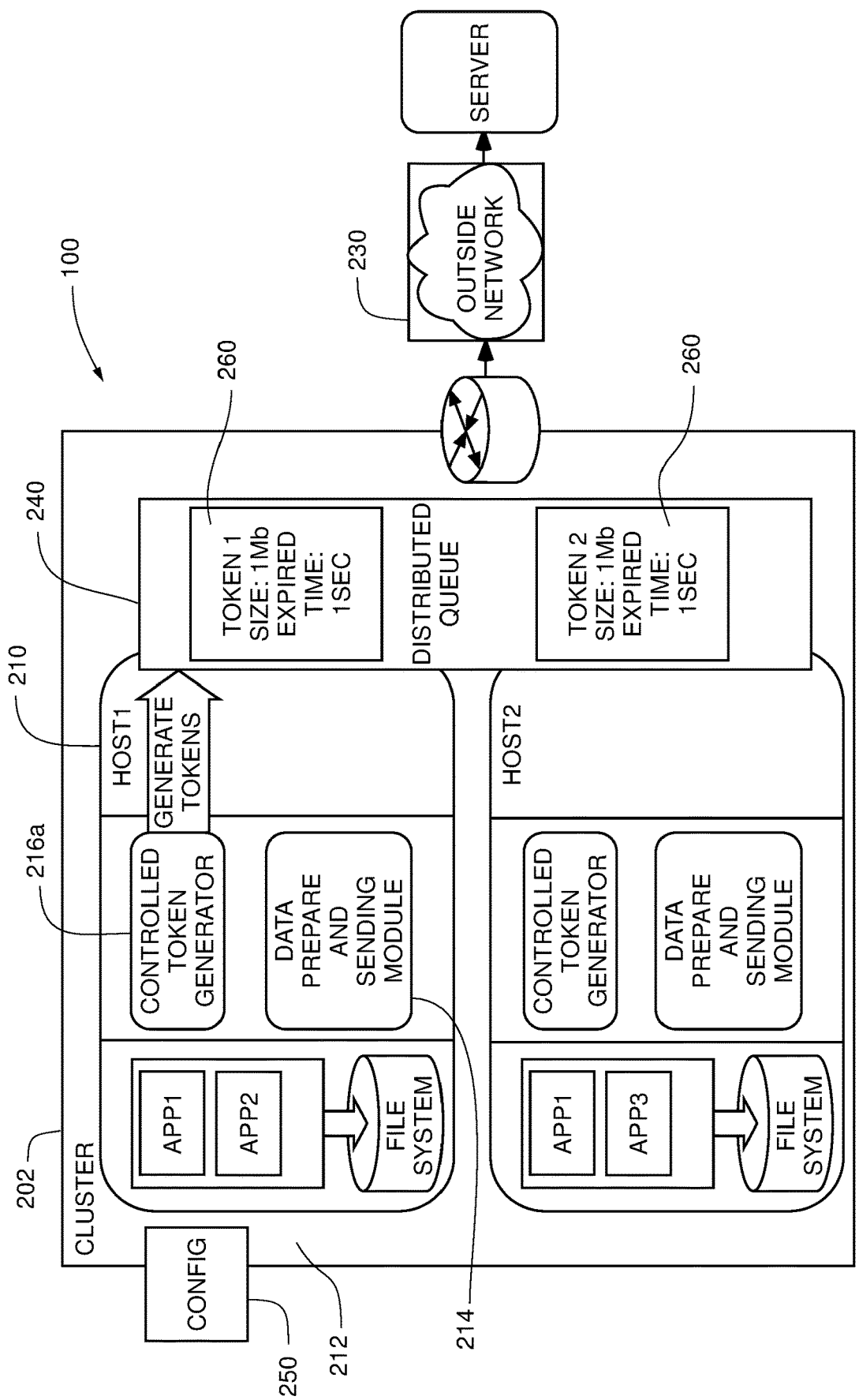
Figure 2C:
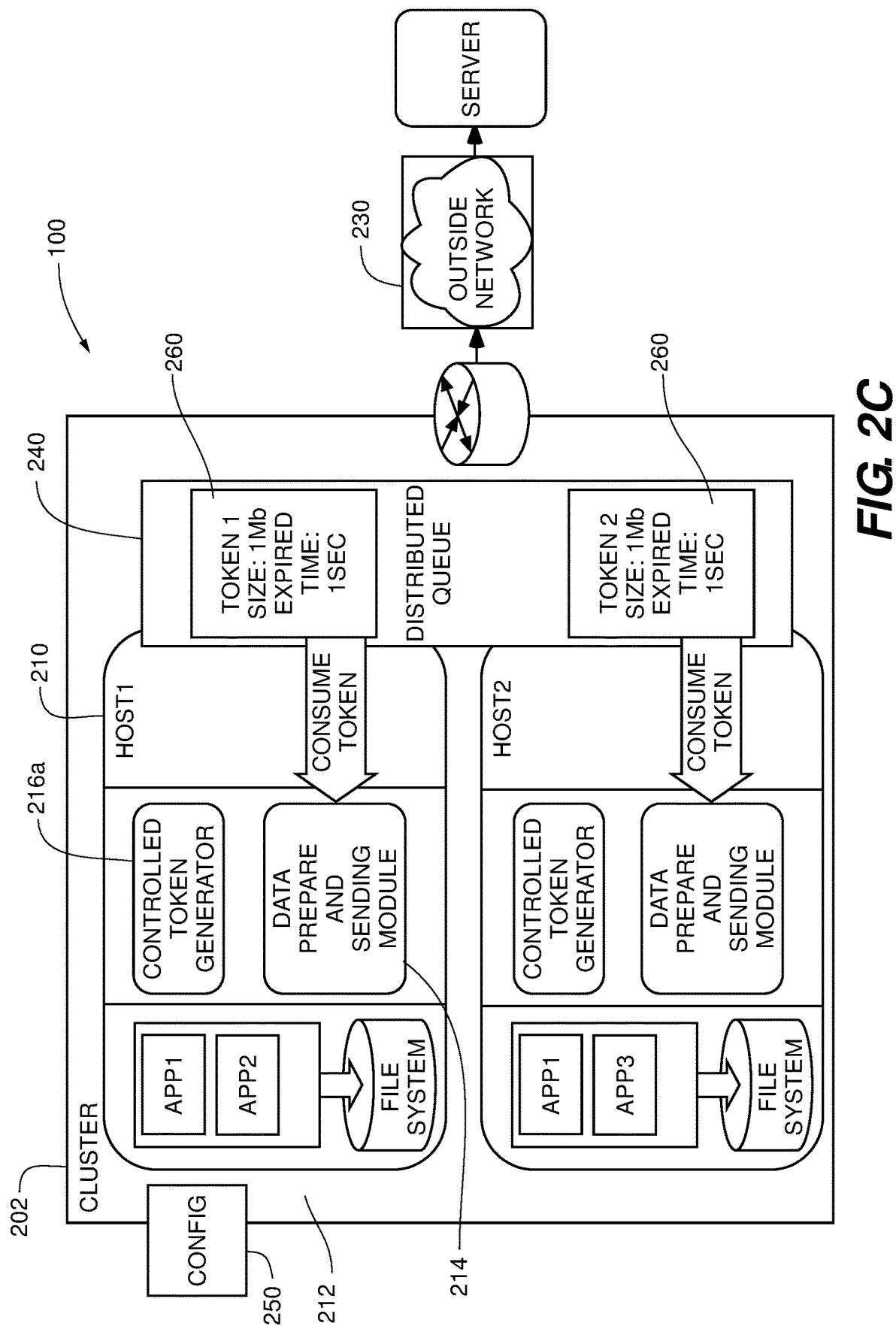
Figure 2D:
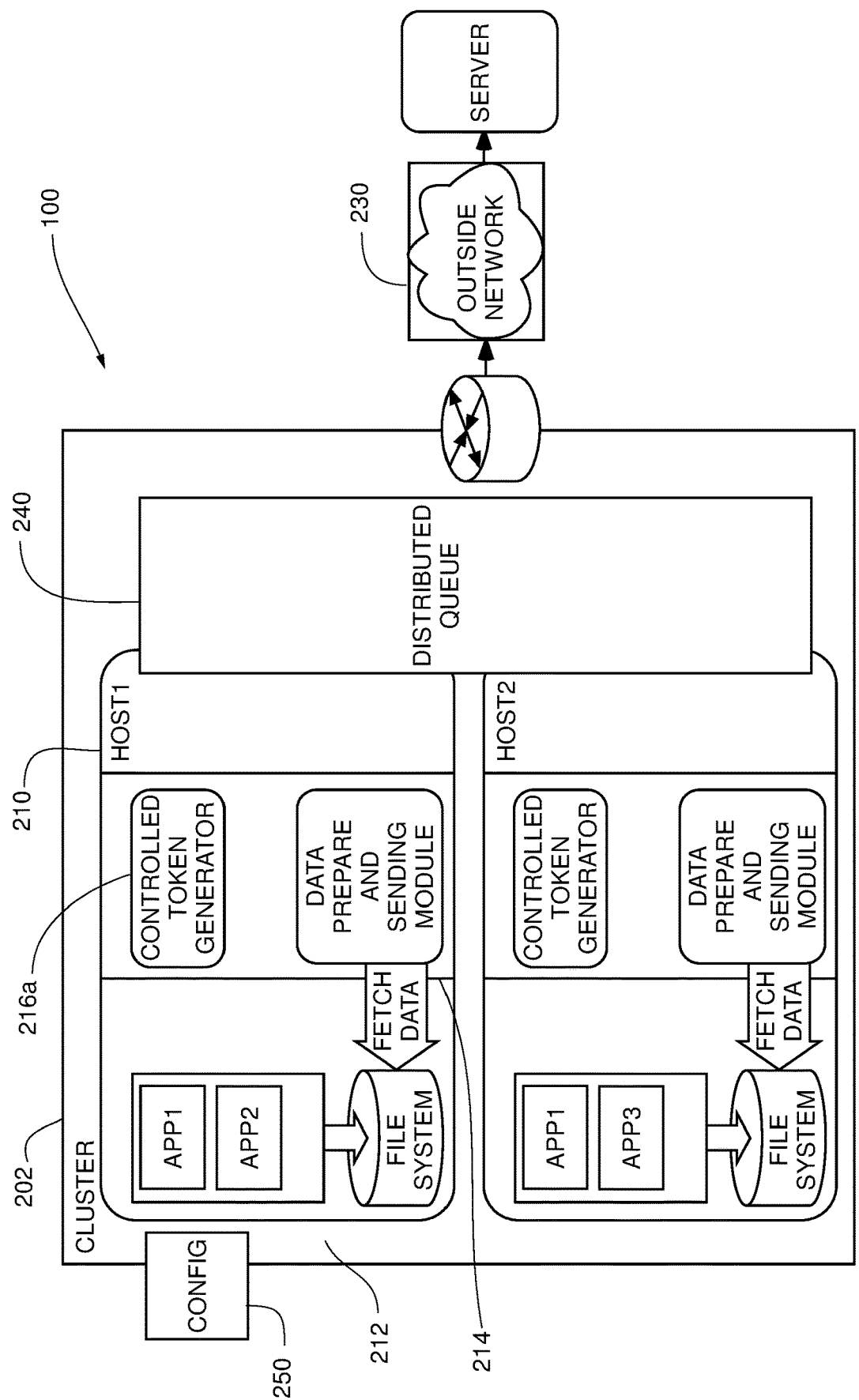
Figure 2E:
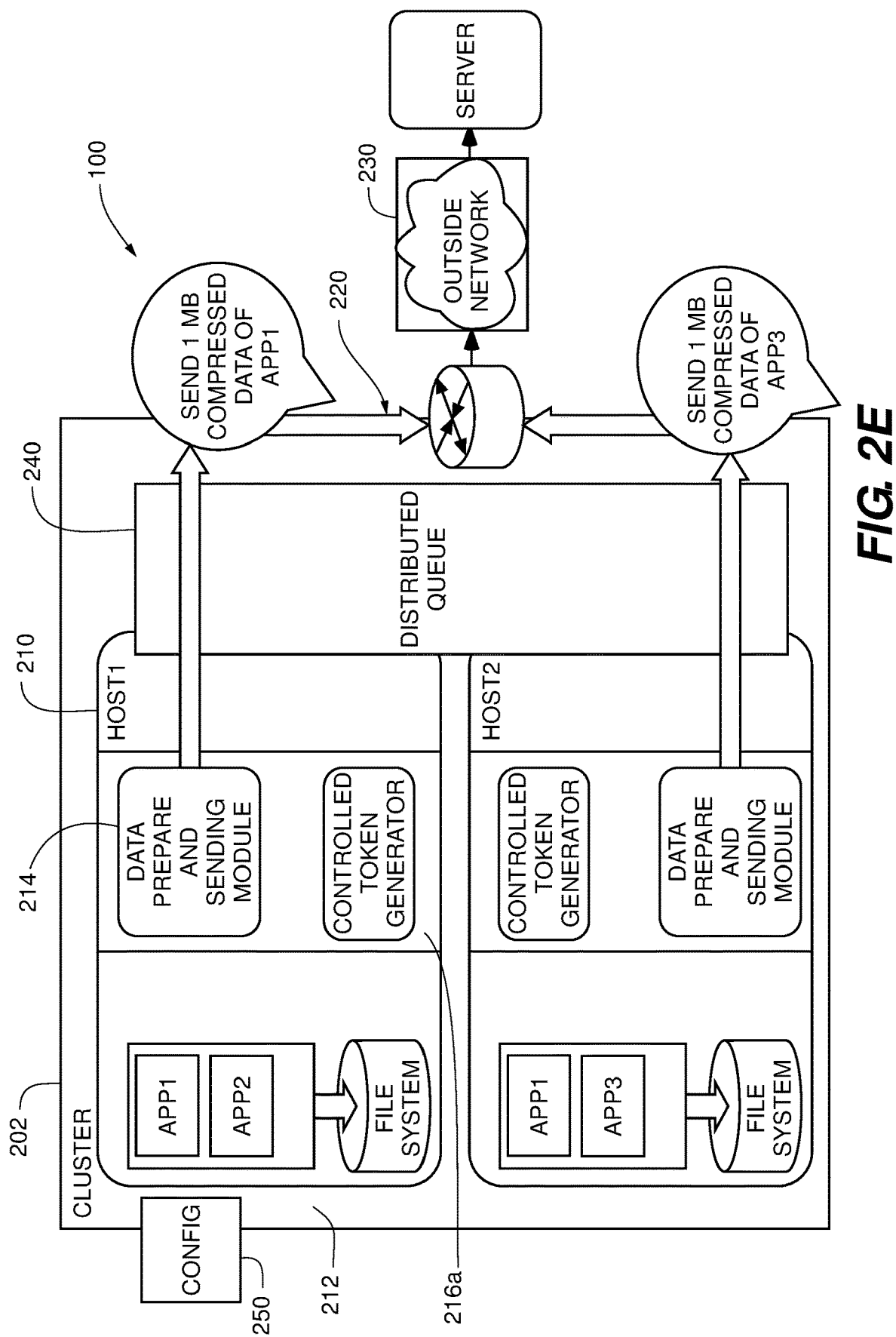

A first example is illustrated in FIGS. 2A-2E. In FIG. 2A, active token generator module 216a receives a current bandwidth allocation for cluster 202 from a configuration file or module 250. In FIG. 2B, active token generator module 216a begins generating and pushing tokens 260 to distributed queue 240. Two tokens (Token1 and Token2) 260, both having the same value (size) and expiry time and no prioritization, are shown in distributed queue 240 in FIG. 2B. In reality, many more tokens 260 may be generated and present in distributed queue 240 at any given time. In FIG. 2C, data management module 214 of each Host1 and Host2 requests a token 260 from distributed queue 240. In FIG. 2D, after receiving the tokens 260, each data management module 214 fetches data from apps 212, and in FIG. 2E data managements modules 214 compress and send the data via network 220 to external network 230 in accordance with tokens 260, thereby consuming tokens 260.

Figure 3A:
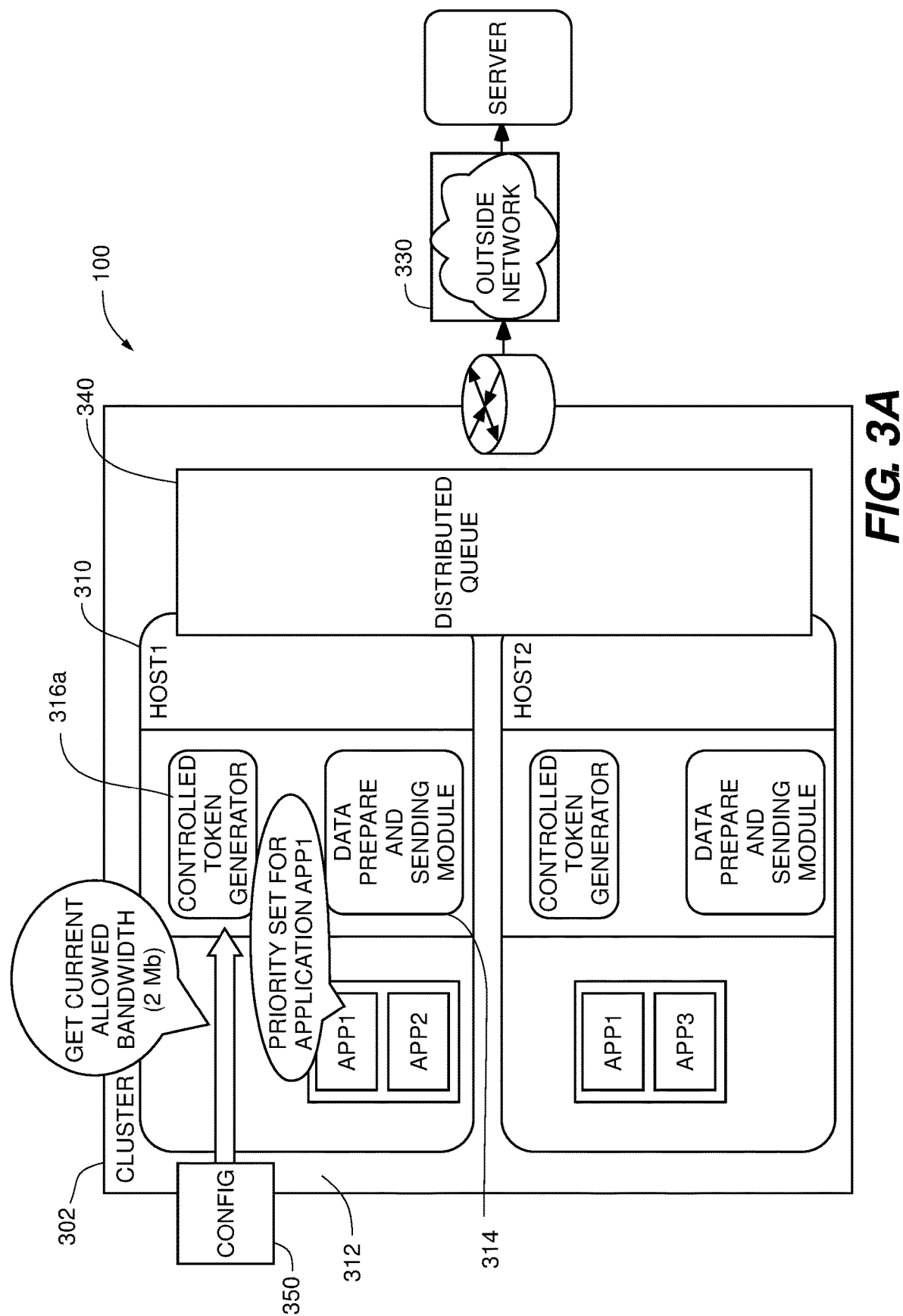
FIGS. 3A-3E are block diagrams that illustrate another example operation of a multi-host system for coordinating data transfer on a network according to an embodiment.
Figure 3B:
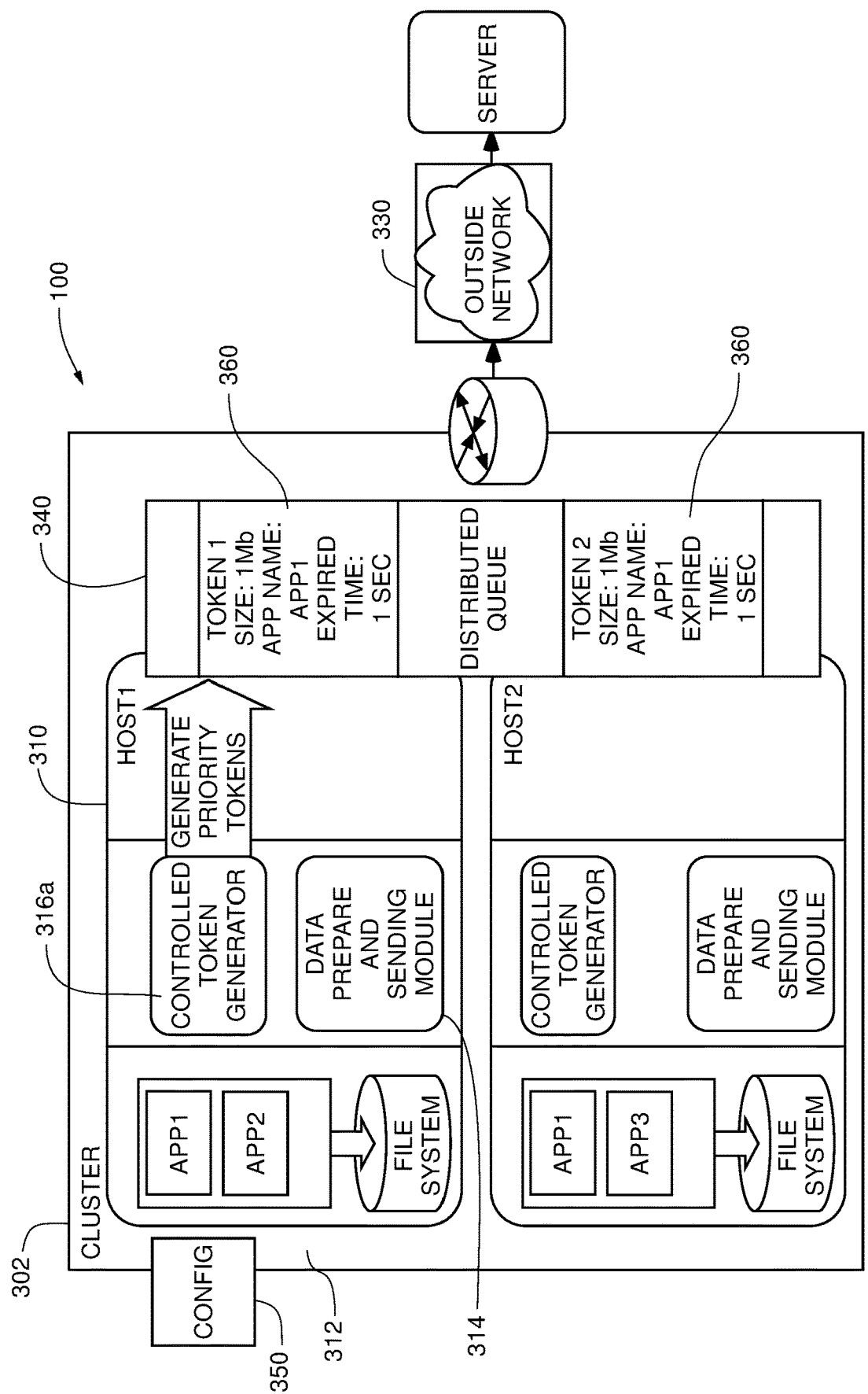
Figure 3C:
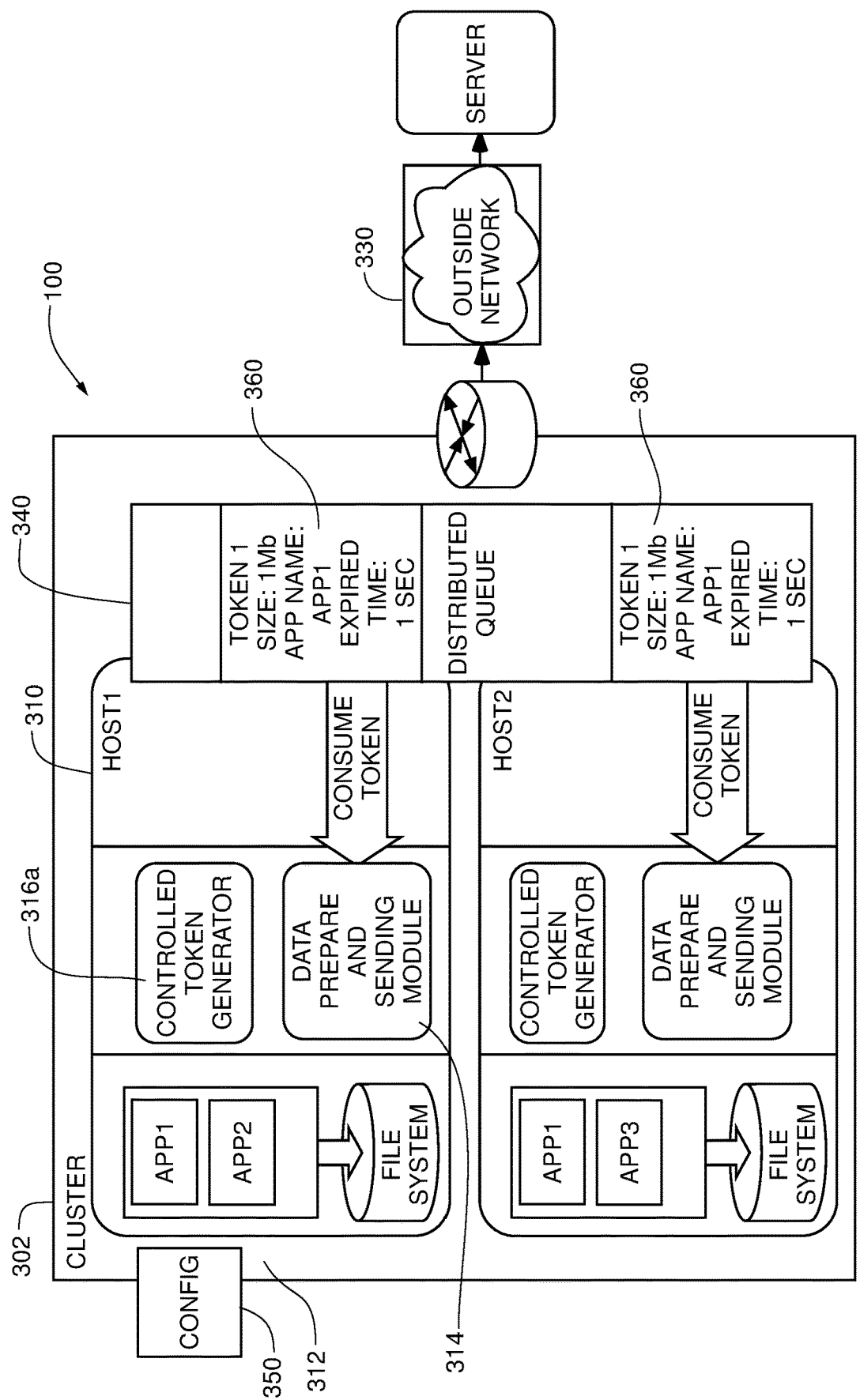
Figure 3D:
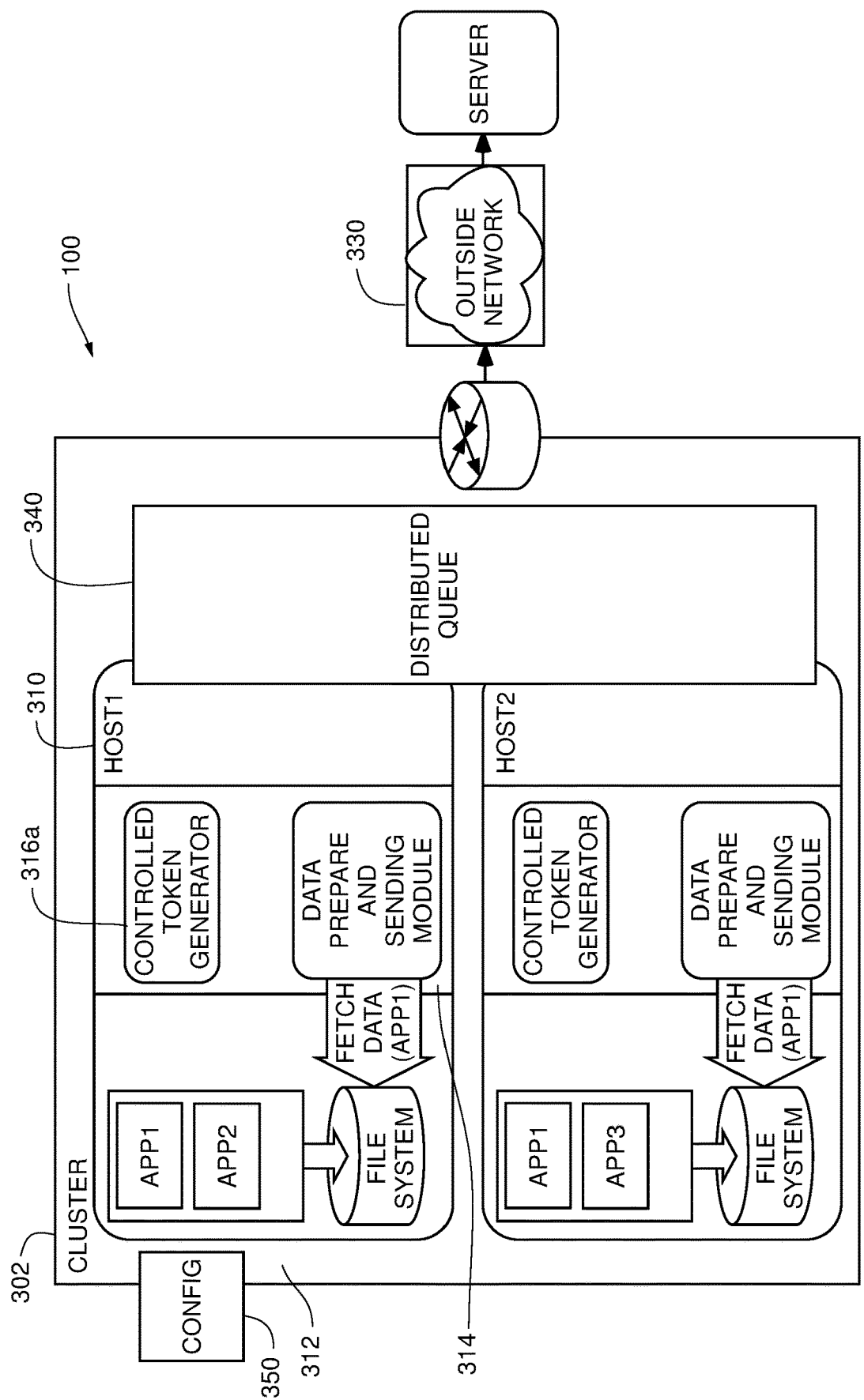
Figure 3E:
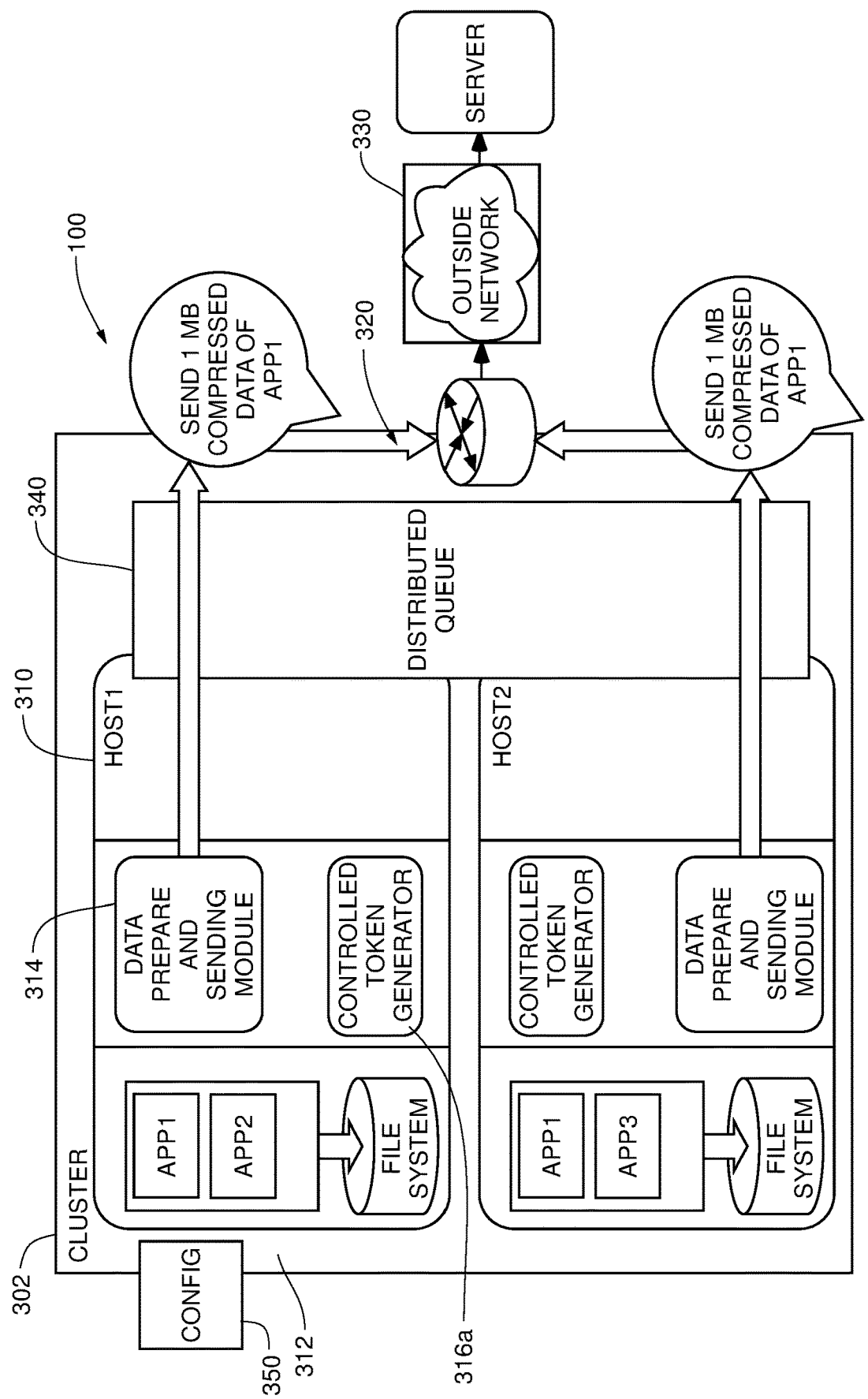

A second example in which prioritization is used is illustrated in FIGS. 3A-3E. In FIG. 3A, active token generator module 316a receives a current bandwidth allocation for cluster 302 from configuration file or module 350. Configuration file or module 350 also specifies a priority for App1 (or data therefrom). In FIG. 3B, active token generator module 316a begins generating tokens 360 and pushing tokens 360 to distributed queue 340. Two tokens (Token1 and Token2) 360, both having the same value (size) and expiry time and prioritization of App1, are shown in distributed queue 340 FIG. 3B. In FIG. 3C, data management module 314 of each Host1 and Host2 requests a token 360 from distributed queue 340. In FIG. 3D, and after receiving the tokens 360, each data management module 314 fetches data from apps 312, specifically App1 in accordance with the prioritization specified in tokens 360. Both host devices 310 have App1 and thus can accept tokens 360 and send data according to the prioritization of those tokens 360. In FIG. 3E data managements modules 314 compress and send the data via network 320 to external network 330 in accordance with tokens 360, thereby consuming tokens 360.

Figure 4A:
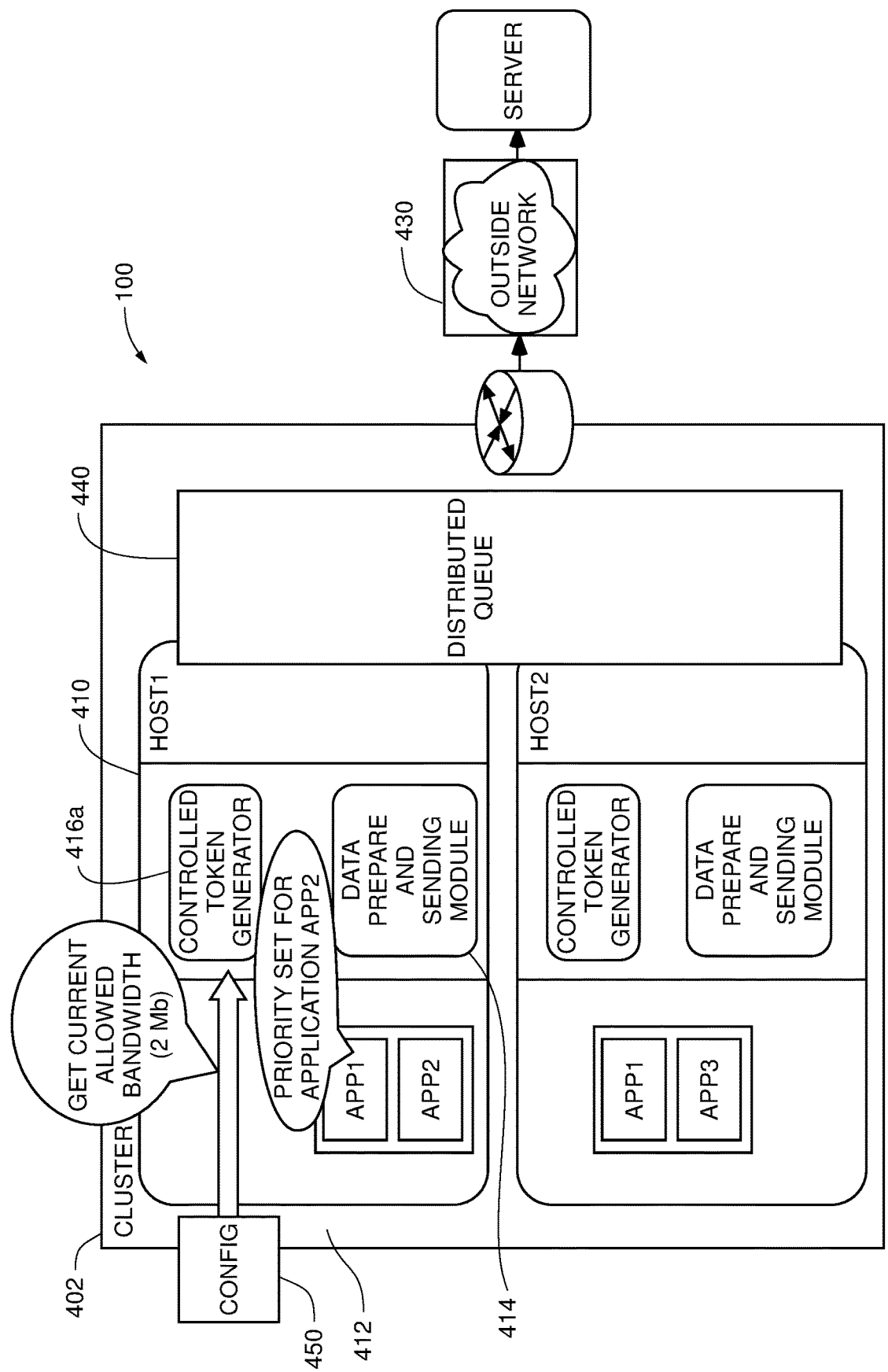
FIGS. 4A-4F are block diagrams that illustrate another example operation of a multi-host system for coordinating data transfer on a network according to an embodiment.
Figure 4B:
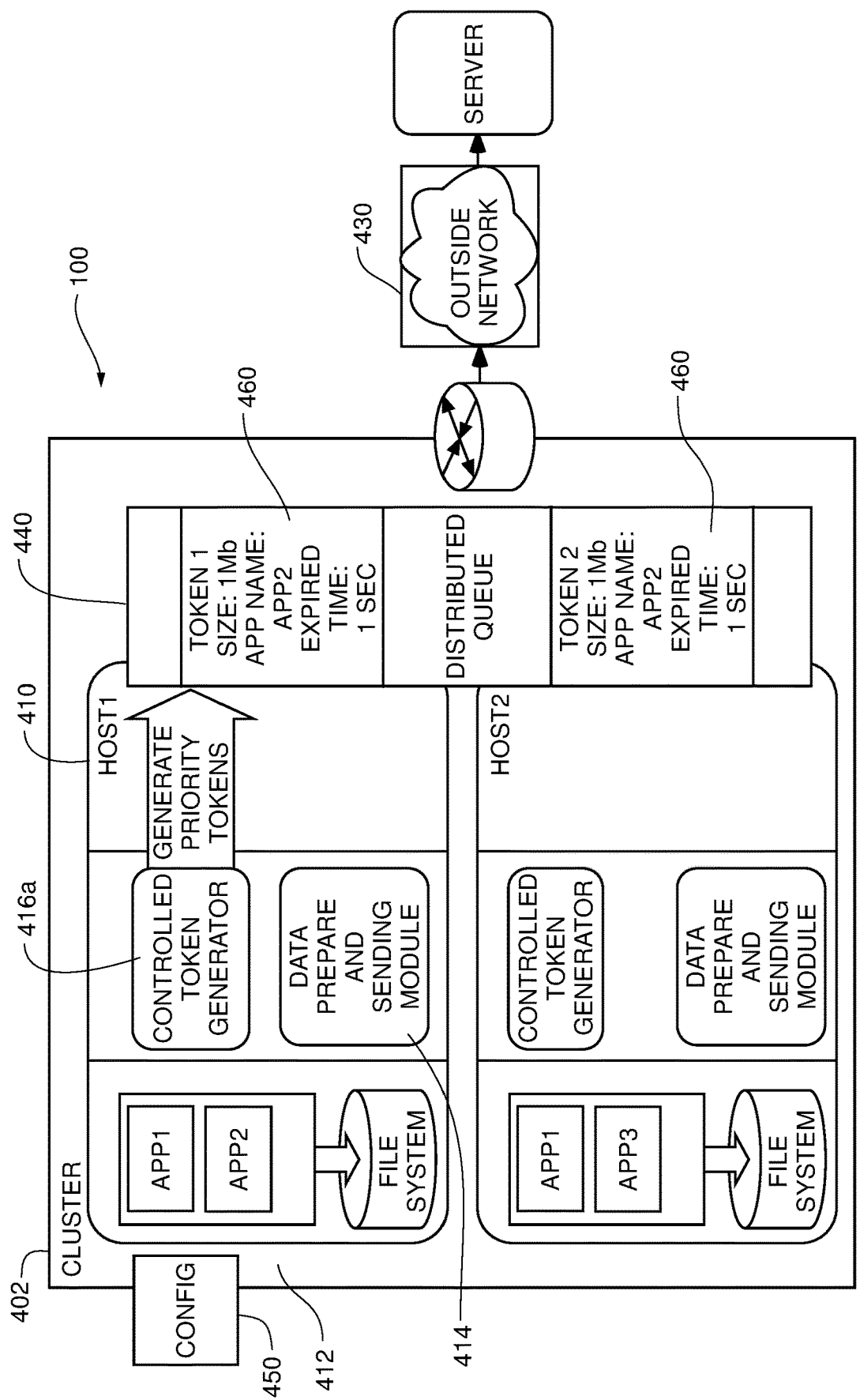
Figure 4C:
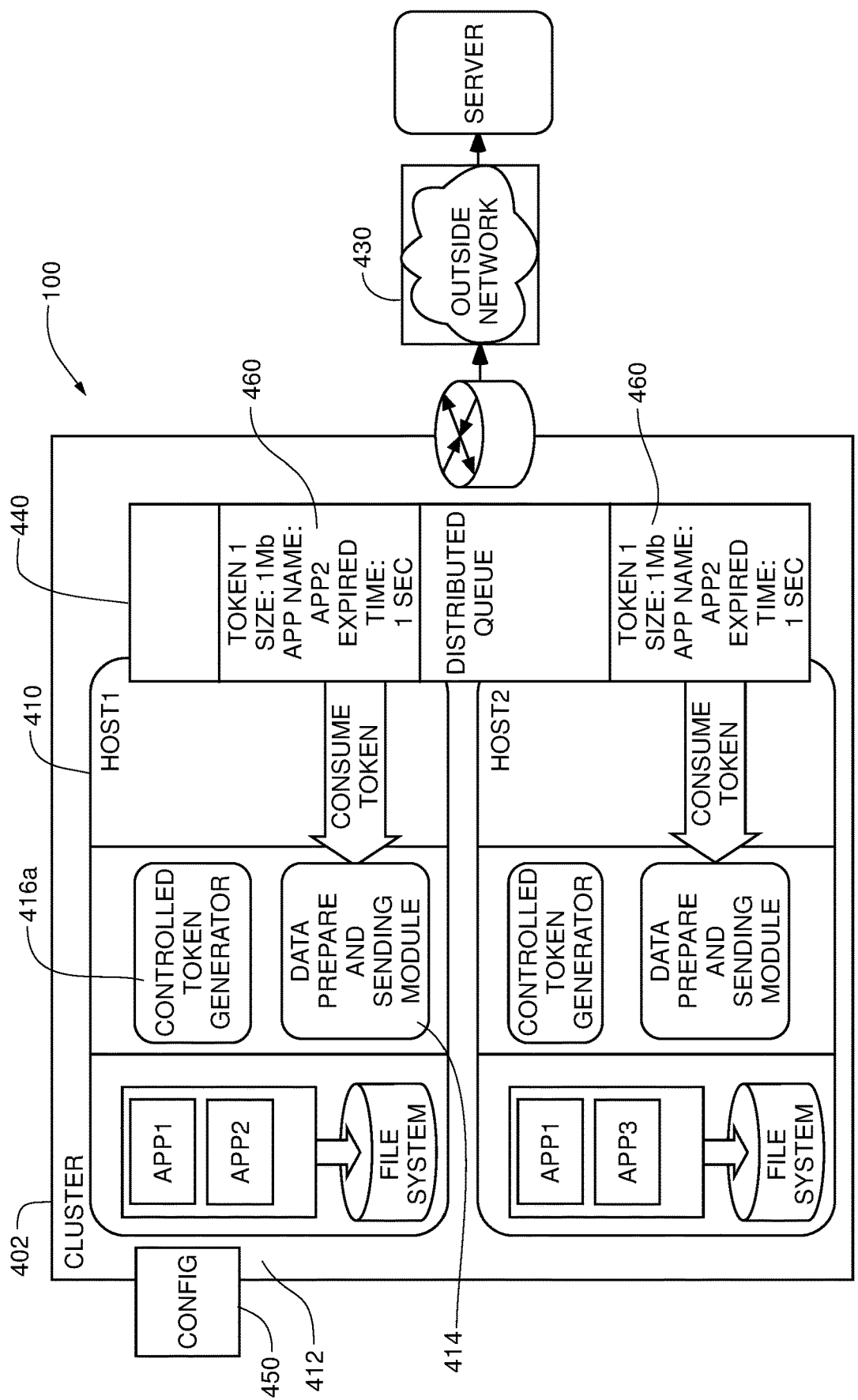
Figure 4D:
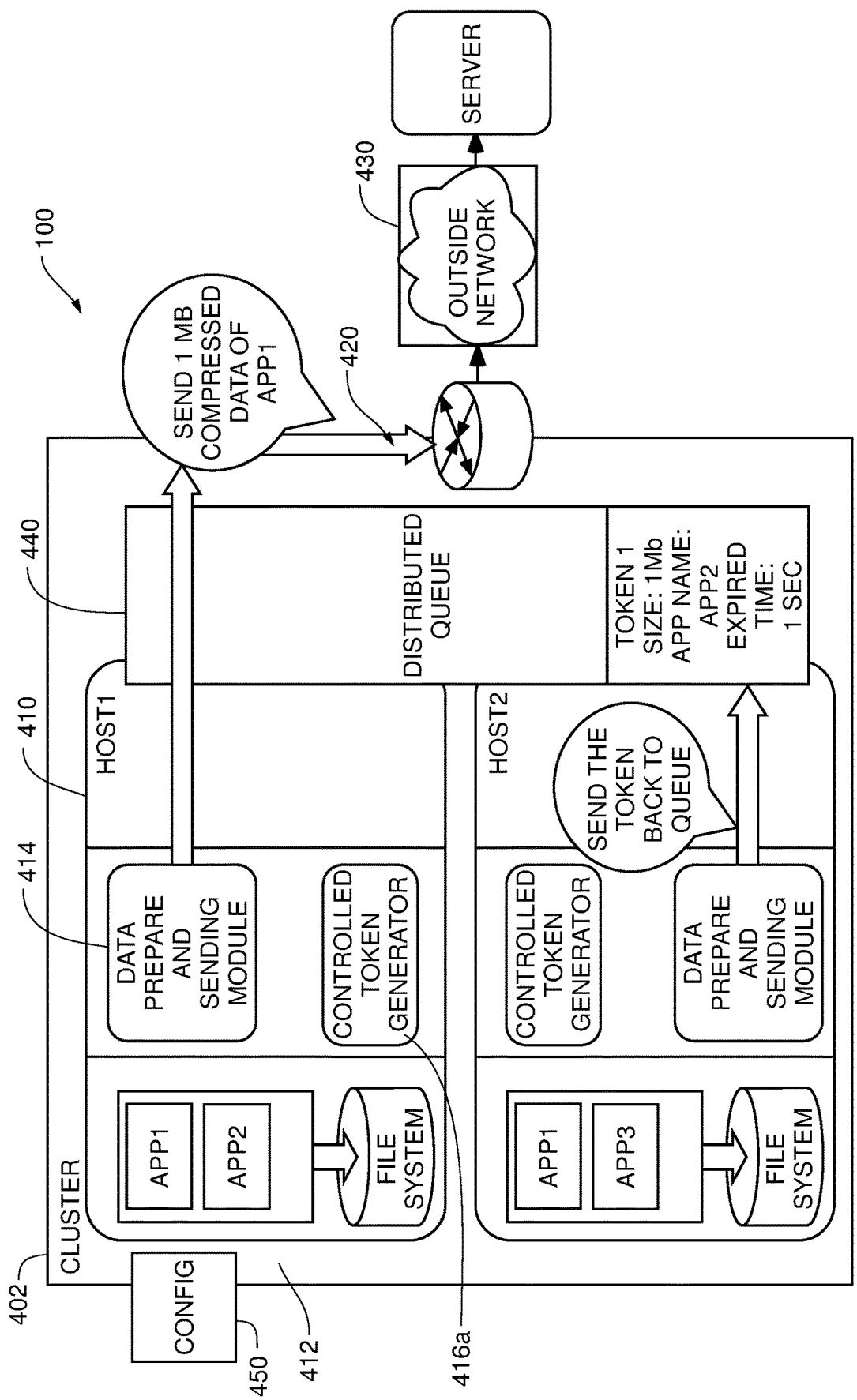
Figure 4E:
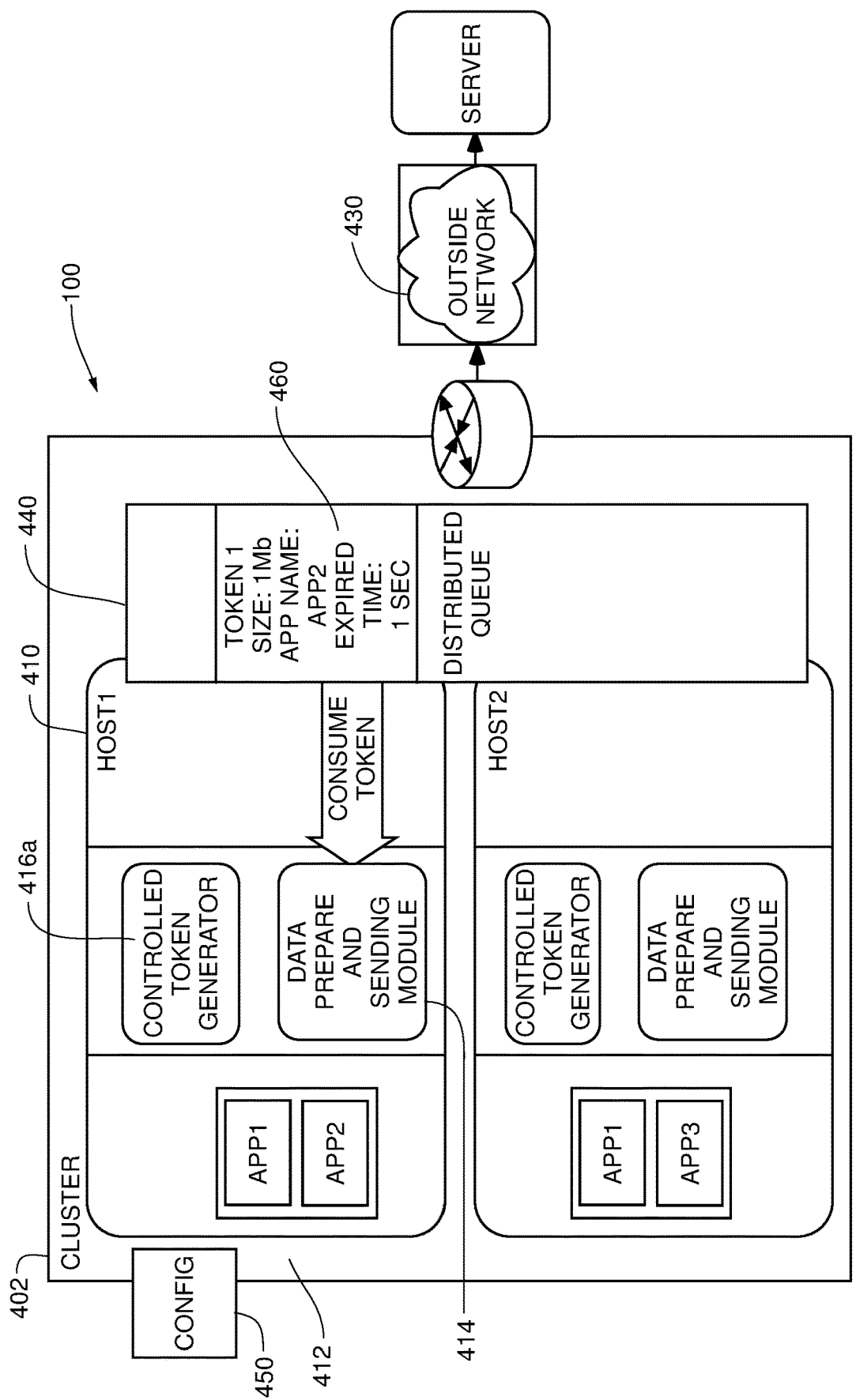
Figure 4F:
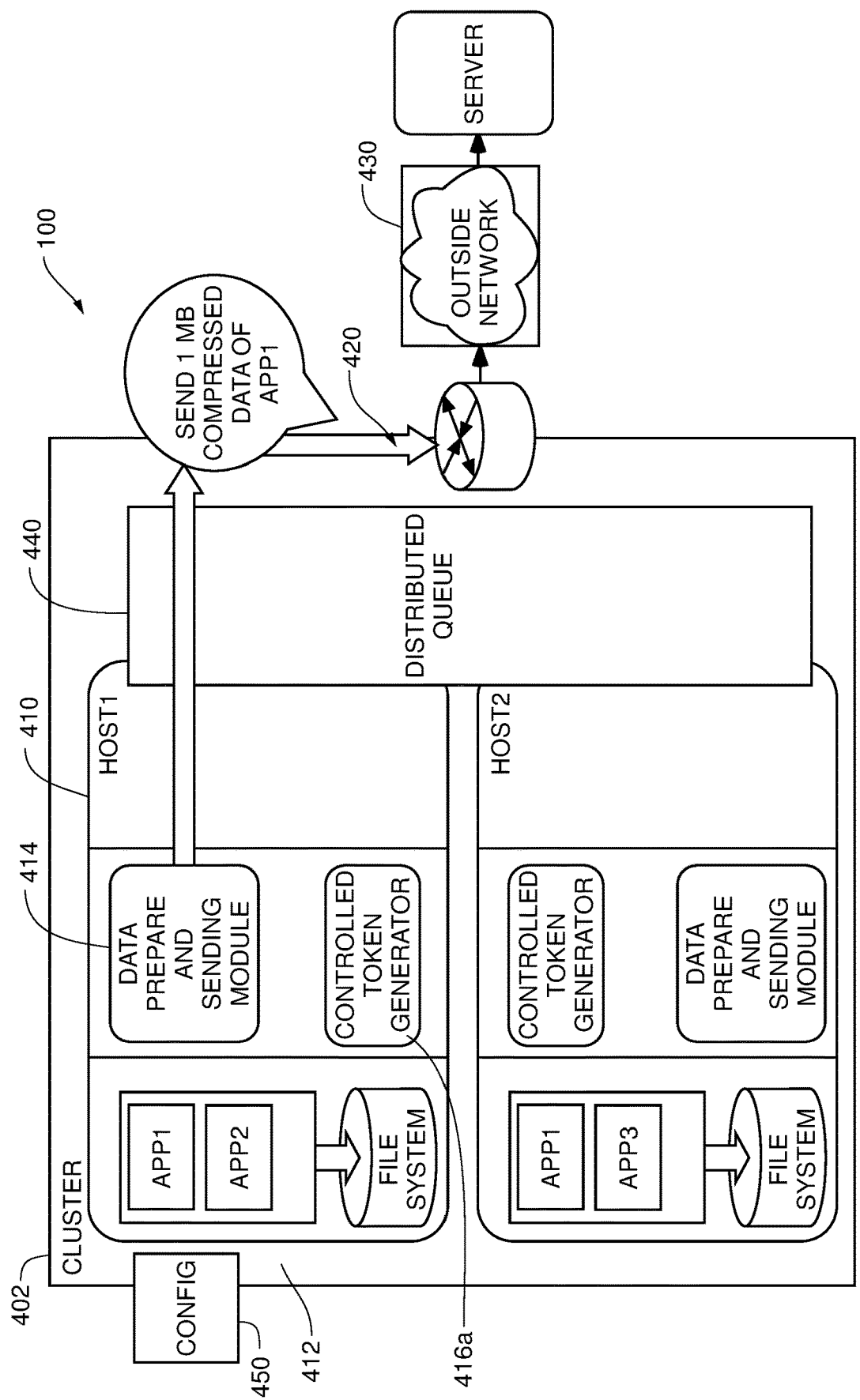

Another example in which prioritization is used is illustrated in FIGS. 4A-4F. In FIG. 4A, active token generator module 416a receives a current bandwidth allocation for cluster 402 from configuration file or module 450. Configuration file or module 450 also specifies a priority for App2 (or data therefrom). In FIG. 4B, active token generator module 416a begins generating tokens 460 and pushing the tokens 460 to distributed queue 440. Two tokens (Token1 and Token2) 460, both having the same value (size) and expiry time and prioritization of App2, are shown in distributed queue 440 FIG. 4B. In FIG. 4C, data management module 414 of each Host1 and Host2 requests a token 460 from distributed queue 440. In FIG. 4D, and after receiving tokens 460, data management module 414 of Host1 fetches data from apps 412, specifically App2 in accordance with the prioritization specified in token 460, and sends the data via network 420 to external network 430 in accordance with token 460, thereby consuming token 460. Data management module 414 of Host2, however, cannot consume token 460 because Host2 does not have data that matches the prioritization (i.e., from App2) of token 460. Therefore, data management module 414 of Host2 returns its token 460 to distributed queue 440. In FIG. 4E, data management module 414 of Host1 requests and receives another token 460 from distributed queue 440. Another token 460 is present at least because of the token returned by Host2. Thus, in FIG. 4F, data management module 414 of Host1 compresses and sends additional data from App2 via network 420 to external network 430 in accordance with token 460, thereby consuming another token 460.

Figure 5:
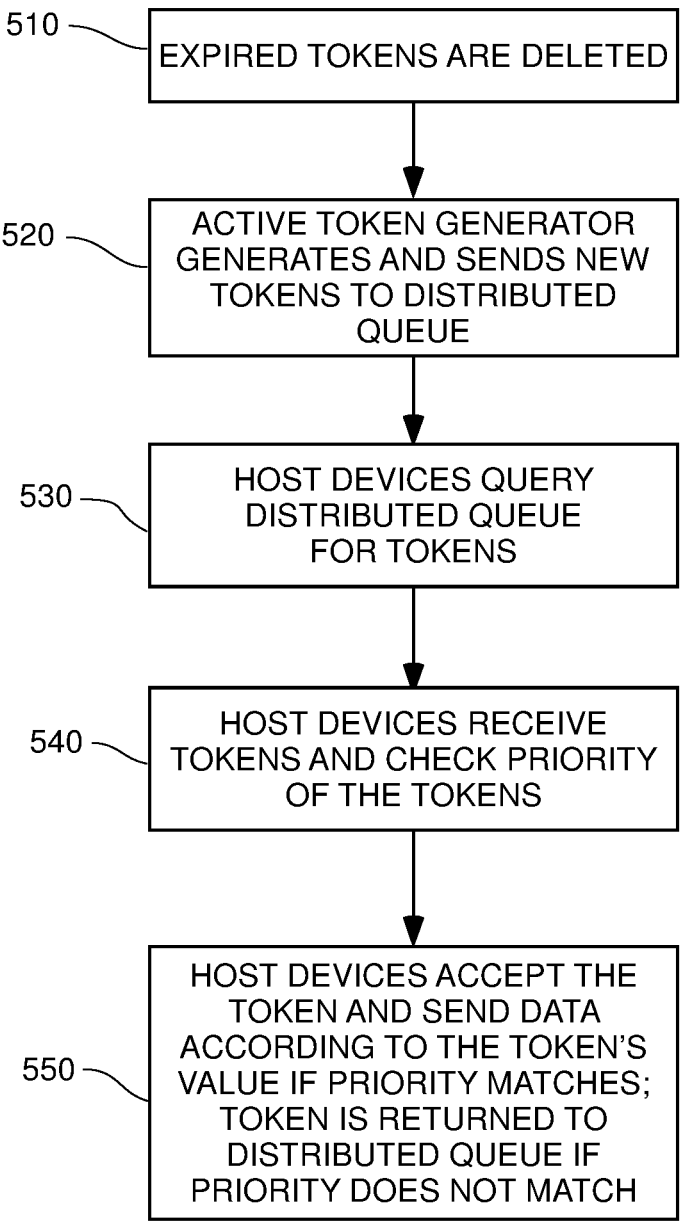
FIG. 5 is a flowchart of a method of coordinating data transfer on a network according to an embodiment.
Figure 6:
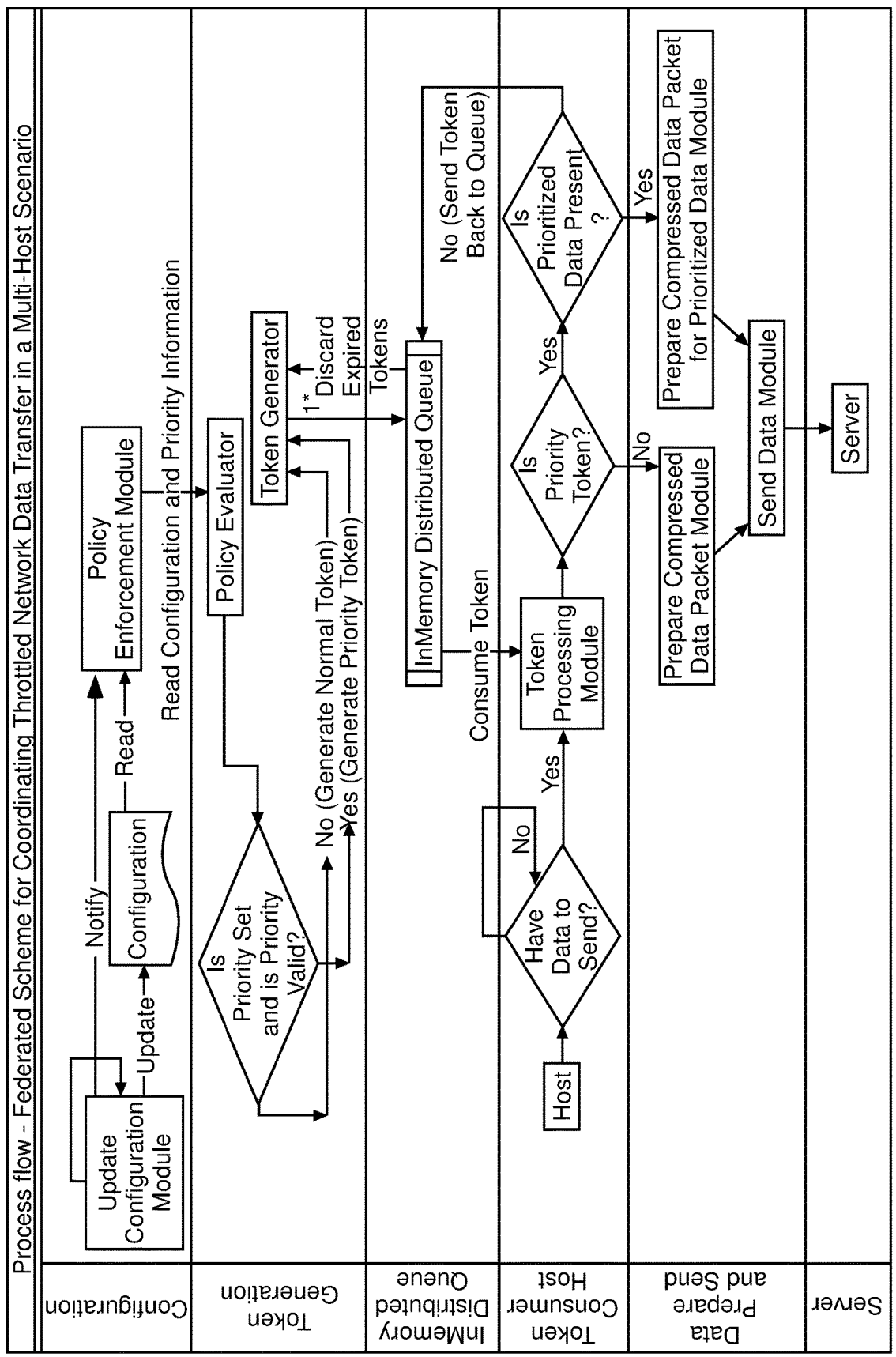
FIG. 6 is a flow diagram of a method of coordinating data transfer on a network according to an embodiment.

Referring again to FIGS. 1A and 1B and also to FIG. 5, a method in accordance with an embodiment of the above-discussed roles of host devices 110 and token generator modules 116 and 116a is depicted. At 510, a new unit of time begins, and any expired tokens (i.e., unused tokens from a previous unit of time) are deleted. At 520, active token generator module 116a begins generating new tokens, sending the new tokens to distributed queue device 140. At 530, a host device 110, which can be the same host device of active token generator module 116a or a different host device of cluster 102 and system 100, has data to send and queries distributed queue device 140 for a token. More than one host device 110 can request a token at the same time. At 540, the querying host device(s) 110 receives a token and checks any priority associated with the token. If the priority matches the source or data of the querying host device 110, or if there is no priority associated with the token, the querying host device 110 accepts the token and sends data in accordance with the allocation of the token at 550. In other embodiments, additional tasks to those depicted in FIG. 5 can be included, for example as discussed herein above in the context of FIGS. 3A-4F, or tasks may be omitted or reordered. Another depiction of the examples of FIGS. 3A-4F and the method of FIG. 5 can be seen in the process flow diagram of FIG. 6.

Embodiments of systems and methods discussed herein provide improvements and advantages with respect to conventional approaches. These include adaptability to changing bandwidth and other conditions; no single point of failure; little data movement on the internal network; ability to prioritize apps and/or data, if necessary or desired; no logic at the router level; reduced or eliminated opportunity for data inconsistency; and no opportunity of abuse or "hogging" of tokens by any particular device. Additionally, tokens can be consumed by any host device, if they are not prioritized, and tokens are requested by the data consumers (e.g., host devices) themselves. Embodiments can improve the operation of devices within the system, as well as the system as a whole, by creating new ways for, and implementing in use, coordination of utilization of available network resources among devices. Use of available bandwidth by the devices can be managed and optimized, thereby improving operation of the devices and the system.

In embodiments, system 100 and/or its components can include computing devices, microprocessors and other computer or computing devices, which can be any programmable device that accepts digital data as input, is configured to process the input according to instructions or algorithms, and provides results as outputs. In an embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the invention.

In embodiments, the system or components thereof can comprise or include various engines or modules, each of which is constructed, programmed, configured, or otherwise adapted, to autonomously carry out a function or set of functions. The terms "engine" and "module" as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine or module can also be implemented as a combination of the two, with certain functions facilitated by hardware alone, and other functions facilitated by a combination of hardware and software. In certain implementations, at least a portion, and in some cases, all, of an engine or module can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine or module can be realized in a variety of physically realizable configurations, and should generally not be limited to any particular implementation exemplified herein, unless such limitations are expressly called out. In addition, an engine can itself be composed of more than one sub-engines or sub-modules, each of which can be regarded as an engine or module, respectively, in its own right. Moreover, in the embodiments described herein, each of the various engines or modules corresponds to a defined autonomous functionality; however, it should be understood that in other contemplated embodiments, each functionality can be distributed to more than one engine or module. Likewise, in other contemplated embodiments, multiple defined functionalities may be implemented by a single engine or module that performs those multiple functions, possibly alongside other functions, or distributed differently among a set of engines or modules than specifically illustrated in the examples herein.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:

1. A multi-host system for coordinating data transfer to an external network, comprising:
    a plurality of host devices communicatively coupled to a shared internal network and the external network, each of the plurality of host devices comprising:
        a portion of a distributed queue, each portion of the distributed queue of one of the plurality of host devices being synched with other portions of the distributed queue of other ones of the plurality of host devices via the internal network, and
        a token generator module, the token generator module of one of the plurality of host devices being an active token generator module, and the token generator module of each of the remaining plurality of host devices being an inactive token generator module,
    the active token generator module configured to generate and send at least one new token to the distributed queue such that any of the plurality of host devices that query the distributed queue receive a new token from the distributed queue, the received new token permitting a recipient host device to send data to the external network via the shared internal network in accordance with a term of the received new token, the term of the received new token selected from the group consisting of: a value, a time unit, and a priority;
    the inactive token generator modules configured to monitor the health of the active token generator module and, upon detection that the active token generator module is unavailable, activate a process to select a new active token generator module from the remaining plurality of token generator modules based on at least one of: a characteristic of the token generator module, or a characteristic of the host device of the token generator module;
    wherein the number of new tokens generated by the active token generator module corresponds to an amount of bandwidth allocated to the plurality of host devices.

2. The system of claim 1, wherein the term of the received new token is a priority, and wherein the recipient host device is permitted to send data via the network if the data matches the priority.

3. The system of claim 2, wherein the priority is one of a data type or a data source.

4. The system of claim 3, wherein the data source is an application operating at least partially on the recipient host device.

5. The system of claim 1, wherein the term of the received new token is a time unit specifying a period during which the received new token must be used by the recipient host device.

6. The system of claim 5, wherein the time unit is a number of seconds.

7. The system of claim 5, wherein the distributed queue is configured to delete an unused token when the time unit associated with the unused token expires.

8. The system of claim 1, wherein the term of the received new token is a value of the token, and wherein the recipient host device is permitted to send via the network an amount of data that corresponds to the value of the received new token.

9. The system of claim 8, wherein the value is a number of bytes.

10. A method of coordinating data transfer to an external network, comprising:

generating at least one new token by an active token generator module of one of a plurality of devices communicatively coupled to a shared internal network and the external network;

holding the generated at least one new token in a queue distributed and synchronized between the plurality of devices via the internal network;

requesting a new token from the queue by any of the plurality of devices that wants to send data over the external network;

receiving the new token by the requesting device;

checking at least one term of the received new token the term of the received new token selected from the group consisting of: a value, a time unit and a priority;

sending the data to the external network via the internal network by the requesting device in accordance with the at least one term;

monitoring, by inactive token generator modules of the others of the plurality of devices, the health of the active token generator module; and upon detection that the active token generator module is unavailable, activating a process to select a new active token generator module from the remaining plurality of token generator modules based on at least one of: a characteristic of the token generator module, or a characteristic of the host device of the token generator module;

wherein the number of new tokens generated by the active token generator module corresponds to an amount of bandwidth allocated to the plurality of host devices.

11. The method of claim 10, further comprising assigning a value to the least one new token as the term of the token, wherein the sending further comprises sending an amount of data that corresponds to the value of the received new token.

12. The method of claim 11, wherein the value is a number of bytes.

13. The method of claim 10, further comprising:
assigning a priority to the at least one new token as the term of the token; and
sending the data over the network by the requesting device if the priority of the received new token corresponds to the data.

14. The method of claim 13, wherein the priority is at least one of a type of the data or a source of the data.

15. The method of claim 10, further comprising associating the at least one new token with a time unit as the term of the token, wherein the at least one new token must be used by one of the plurality of devices within the time unit.

16. The method of claim 15, further comprising deleting any unused tokens when the time unit associated with the unused tokens expires.

17. The method of claim 10, further comprising sending the generated at least one new token from the active token generator to the queue.

18. The method of claim 10, wherein the sending further comprises compressing the data.

* * * * *